Patented May 8, 1934

1,957,794

UNITED STATES PATENT OFFICE 1,957,794

TREATMENT OF HYDROCARBON OILS

Jacque C. Morrell and Gustav Egloff, Chicago, Ill., assignors to Universal Oil Products Company, Chicago, Ill., a corporation of South Dakota No Drawing. Application June 19, 1931
Serial No. 545,479

1 Claim. (Cl. 196—29)

This invention relates to the treatment of hydrocarbon oils, and refers more particularly to treatment of the low boiling hydrocarbon fractions products in the cracking of the heavy portions of petroleum though similar distillates from the straight run distillation of petroleum may also be used. More particularly, the invention is directed towards the removal of sulphur from such hydrocarbons.

In a more specific aspect the invention is concerned with the treatment of vapors of approximate gasoline boiling point range arising from cracking operations upon heavier oils, a particular object of the invention being embodied in the treatment of such vapors prior to their condensation by reagents adapted to selectively reduce the percentage of gum-forming constituents and the sulfur content, so that the condensed vapors may be recovered as a gasoline suitable in all respects for use as motor fuel.

In one specific embodiment the invention comprises treating cracked vapors with ozone or ozone-containing gas mixtures, such as ozonized air, and alkaline solutions in the presence of solid adsorbent and/or contact materials.

A considerable variety of treatments have been proposed for removing excessive amounts of undesirable olefinic or sulfur-containing constituents from cracked vapors to render the condensates more stable in respect to gum content, color and corrosive properties, so that minimum amounts of further chemical treatment and no redistillation is necessary to produce a finished product. Some of these processes have met with extensive commercial application and it is with improvements in these processes and the addition of novel features thereto that the present invention is concerned, the use of ozone in controllable percentages in gas treating mixtures and the employment therewith of alkaline solutions and contact materials furnishing a general treating method, the degree of which can be varied to produce a wide variety of treating effects with consequent applicability to many different types of cracked vapors.

Ozone has been recognized as a powerful oxidizing agent for a long time, its use in destroying bacteria in drinking water and sewage being well-known as are also its uses in miscellaneous bleaching and deodorizing processes. The nature of the chemical reactions following the introduction of ozone into vapor mixtures containing highly unsaturated hydrocarbons will vary according to a number of factors such as the degree of the unsaturation of the vapors, the temperature and pressure and the amount of ozone used. At relatively low temperatures and with hydrocarbons in liquid phase ozone tends to add directly to olefins and diolefins to form ozonides which may be decomposed by hydrolysis to produce acids, aldehydes and ketones of lower molecular weight, the hydrocarbon being generally split at the double bond due to the energetic oxidation reactions. When treatments of cracked vapors containing olefins are conducted, the temperatures are usually above the limit temperatures of stability of the ozonides so that if they are formed at all they are only intermediate transition products which are quickly decomposed by the action of the alkaline reagents, particularly in the presence of adsorbent and catalytic materials.

As alkaline treating reagents for use in conjunction with ozone, aqueous solutions of the commoner alkalies are by far the most convenient, examples of such solutions being those of caustic soda, caustic potash and suspensions of hydrated lime although it is within the scope of the invention to employ also alcoholates, ammonium hydroxide and alkaline solutions of metals such as plumbates, zincates and aluminates, the choice of these alkaline reagents being determined by the general conditions of the treatment and the results desired.

As contact materials, solids of diverse character may be employed such as, for example, metals, metal oxides, metal salts and inert siliceous materials such as sand, fuller's earth, clays, et cetera, the choice of contact materials being determined by their availability as well as by the results desired by their use in connection with the other reagents.

In conducting treatments characteristic of the process of the invention a variety of modes of application may be employed. For example, ozone-containing gas mixture such as ozonized air may be injected into cracked vapors in amounts sufficients to induce proper treating effects and the mixture then passed upwardly through beds of solid contact materials counterflow to descending solutions of alkalies. At other times the cracked vapors with ozone added may be passed through beds of contact material impregnated with or containing in admixture alkaline material, the flow of the vapors in this case being in a downward direction through the contact mass. As a concrete example of this method of treatment the cracked vapors plus ozone in controlled amounts may be passed downwardly over a mixture of finely divided clay and hydrated lime, the ratio of clay to lime being approximately 4:1 by weight.

The invention is not limited to the use of any particular form of apparatus and many other types than the ones mentioned may be employed.

The general function of the alkaline materials used is to neutralize the acidic materials resulting from the oxidation reactions and to assist in the polymerization of the reaction products so that the treating reactions are furthered by the removal of primary reaction products. In cases where considerable production of tarry or resinous material is encountered the alkaline solutions may have also a washing or cleansing effect upon the surface of the contact material so that its efficiency is continuously regenerated.

The function of the solid adsorbent or contact materials is to some extent similar although they may act also to filter out entrained particles so that the condensed vapors will not be contaminated by gum and color-forming compounds.

Numerous examples might be given of the results obtainable by the use of the process of the invention, but it will be sufficient to indicate the commercial advantages of the invention by citing a treatment which may be conducted upon cracked vapors of approximate gasoline boiling point range produced during the cracking of a mixture of Mid-Continent residuum and heavy gas oil distillate from the same type of crude. Such vapors, emerging from the final fractionator of the cracking unit under a pressure of approximately 50 pounds per square inch and a temperature of 370° F. may be passed upwardly through a bed of finely divided clay in a succeeding tower countercurrent to a descending stream of caustic soda whose concentration is maintained by the presence of steam whose partial pressure prevents undue evaporation and concentration of the caustic. There may be added to the vapors prior to their entry into the contact tower an amount of ozonized air equal to approximately ten cubic feet per barrel of condensed gasoline. As ordinarily prepared by ozonizers of the Siemens type, the percentage of ozone in ozonized air will seldom be over a small percentage, say 2%, and the percentage frequently falls below this figure due to inefficient operation of the ozonizing equipment, the presence of moisture and uncontrollable temperature rise which has the effect of dissociating the ozone.

The gasoline produced by merely condensing vapors of the type mentioned without chemical treatment other than neutralization with caustic soda to remove dissolved hydrogen sulfide may have the following properties:

| | |
|---|---|
| Gravity ° A. P. I. | 55 |
| Gums by the copper dish method | 350 mgs. |
| Color | 16 Saybolt |
| Color after 4 hours exposure to sunlight | 6 Saybolt |
| Sulfur | 0.2% |

By applying the process of the invention to the treatment of the vapors in the manner described above the condensed gasoline may then have the following improved characteristics:

| | |
|---|---|
| Gravity ° A. P. I. | 55.5 |
| Gums by copper dish method | 20 mgs. |
| Color | +30 Saybolt |
| Color after 4 hours exposure to sunlight | 27 Saybolt |
| Total sulfur content | 0.08% |

It will be clearly evident from the foregoing disclosure of the nature of the invention and the example of the results obtainable by its application to a particular case that marked benefits are to be derived from its use. However, it will be evident that its applicability is very wide both in regard to the stocks treated, the temperatures and pressures employed, the alkaline solutions and contact materials used and the particular type of equipment in which operations are conducted. Therefore, the specific descriptive material in the preceding specification is not to be construed as embodying limitations upon the generally broad scope of the invention.

We claim as our invention:

A process for refining hydrocarbon vapors comprising passing the same with a small amount of ozone through a bed of subdivided contact material countercurrent to an alkaline solution.

JACQUE C. MORRELL.
GUSTAV EGLOFF.